United States Patent
Chujo et al.

(10) Patent No.: US 8,026,932 B2
(45) Date of Patent: Sep. 27, 2011

(54) IMAGE PROCESSING APPARATUS, IMAGE PROCESSING METHOD, IMAGE PROCESSING PROGRAM, AND IMAGE PICKUP APPARATUS

(75) Inventors: Kaoru Chujo, Kawasaki (JP); Takashi Wakamatsu, Kawasaki (JP); Kimitaka Murashita, Kawasaki (JP); Masayoshi Shimizu, Kawasaki (JP); Akifumi Izumisawa, Kawasaki (JP); Kiyoshi Utsugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 848 days.

(21) Appl. No.: 11/860,865

(22) Filed: Sep. 25, 2007

(65) Prior Publication Data

US 2008/0074441 A1 Mar. 27, 2008

(30) Foreign Application Priority Data

Sep. 27, 2006 (JP) ................... 2006-261788

(51) Int. Cl.
*G09G 5/36* (2006.01)
(52) U.S. Cl. .......................... 345/634; 345/667; 345/629
(58) Field of Classification Search .................. 345/634, 345/667, 629

See application file for complete search history.

(56) References Cited

U.S. PATENT DOCUMENTS

| | | | | |
|---|---|---|---|---|
| 4,553,165 A * | 11/1985 | Bayer | ............................ | 348/618 |
| 5,469,536 A * | 11/1995 | Blank | ............................ | 345/594 |
| 6,157,747 A * | 12/2000 | Szeliski et al. | ................ | 382/284 |
| 6,429,895 B1 | 8/2002 | Onuki | | |
| 6,483,538 B2 * | 11/2002 | Hu | ................................. | 348/180 |
| 6,522,418 B2 * | 2/2003 | Yokomizo et al. | ........... | 358/1.15 |
| 6,571,002 B1 * | 5/2003 | Ogawa | .......................... | 382/117 |
| 7,014,604 B2 | 3/2006 | Vergara | | |
| 7,295,232 B2 | 11/2007 | Washisu | | |
| 7,353,994 B2 * | 4/2008 | Farrall et al. | .................. | 235/454 |
| 7,387,859 B2 * | 6/2008 | Gerlach | .......................... | 430/22 |
| 2001/0040625 A1 * | 11/2001 | Okada et al. | .................. | 348/207 |
| 2001/0053245 A1 * | 12/2001 | Sakai et al. | .................... | 382/151 |

(Continued)

FOREIGN PATENT DOCUMENTS

JP  07-028149 A  1/1995

(Continued)

OTHER PUBLICATIONS

Japanese Office Action dated Dec. 21, 2010, issued in corresponding Japanese Patent Application No. 2006-261788.

(Continued)

*Primary Examiner* — Javid Amini
(74) *Attorney, Agent, or Firm* — Westerman, Hattori, Daniels & Adrian, LLP

(57) ABSTRACT

An image pickup apparatus includes: a first base image selection unit selecting a piece of image data as a first base image used in superposition; a shift amount calculation unit calculating an amount of shift between the first base image and another different piece of image data; an image superposition unit detecting a superposing area as an area in which the different piece of image data can be superposed on the first base image after a shift correction is made on a basis of the calculated amount of shift, and performing superposition for the superposing area; a second base image selection unit selecting a piece of image data as a second base image used in a non-superposing area; and an image combination unit combining a superposition result with the non-superposing area in the second base image, and outputting image data as a combination result.

18 Claims, 11 Drawing Sheets

U.S. PATENT DOCUMENTS

| | | | |
|---|---|---|---|
| 2002/0079425 A1* | 6/2002 | Rhoads | 250/201.9 |
| 2002/0097342 A1* | 7/2002 | Hu | 348/700 |
| 2004/0086170 A1* | 5/2004 | Shishido et al. | 382/149 |
| 2004/0145673 A1* | 7/2004 | Washisu | 348/364 |
| 2005/0213849 A1* | 9/2005 | Kreang-Arekul et al. | 382/284 |
| 2006/0187308 A1* | 8/2006 | Lim et al. | 348/208.4 |
| 2006/0261810 A1* | 11/2006 | Fautz et al. | 324/309 |
| 2008/0109729 A1* | 5/2008 | Notea et al. | 715/722 |
| 2008/0143969 A1* | 6/2008 | Aufranc et al. | 353/30 |
| 2008/0187234 A1* | 8/2008 | Watanabe et al. | 382/254 |
| 2008/0205725 A1* | 8/2008 | Schmitt et al. | 382/130 |
| 2010/0007665 A1* | 1/2010 | Smith et al. | 345/473 |
| 2010/0150474 A1* | 6/2010 | Aiso | 382/284 |

FOREIGN PATENT DOCUMENTS

| | | |
|---|---|---|
| JP | 10-191136 A | 7/1998 |
| JP | 11-331693 A | 11/1999 |
| JP | 2003-333414 A | 11/2003 |
| JP | 2004-221992 A | 8/2004 |
| JP | 2005-020607 A | 1/2005 |
| JP | 2006-246309 A | 9/2006 |

OTHER PUBLICATIONS

Japanese Office Action dated Jul. 5, 2011, issued in corresponding Japanese Patent Application No. 2006-261788 with an English translation.

* cited by examiner

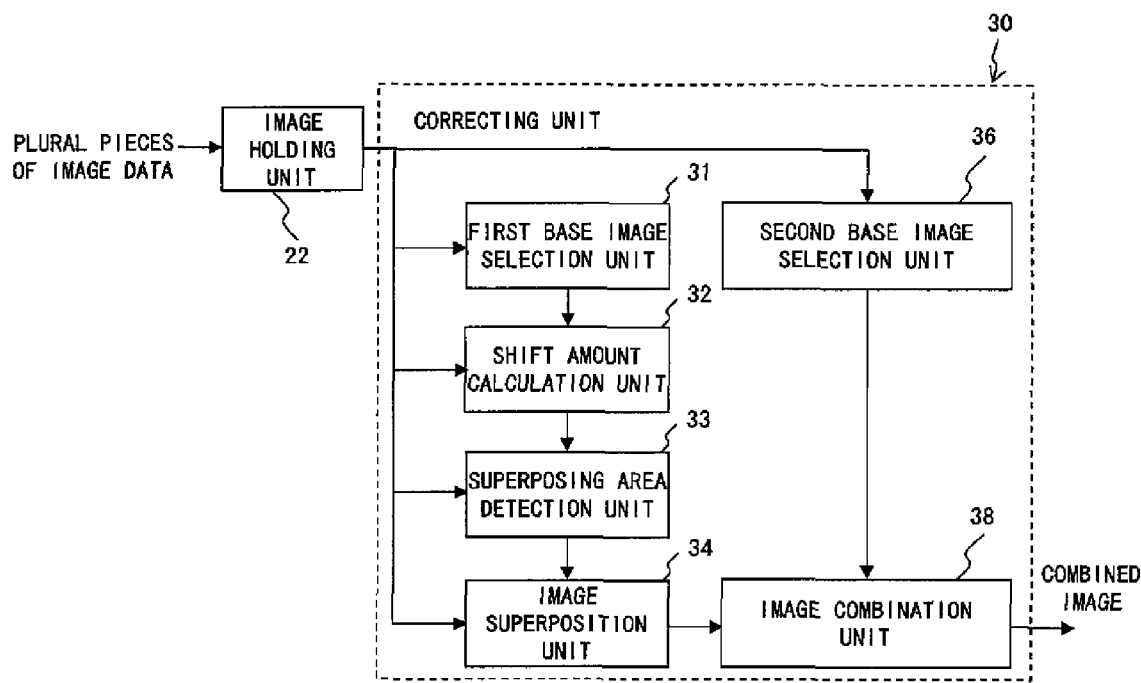
F I G. 3

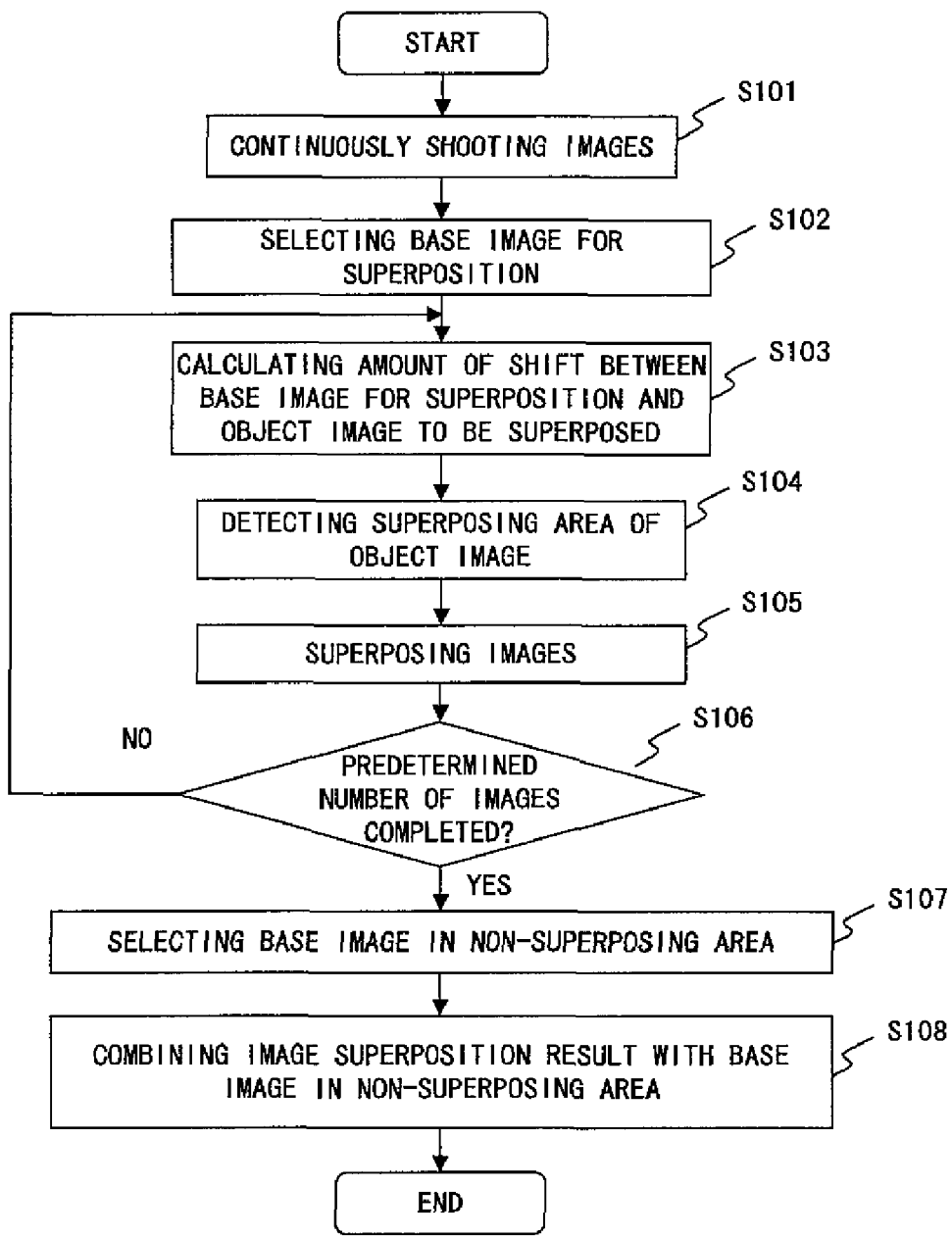
F I G. 4

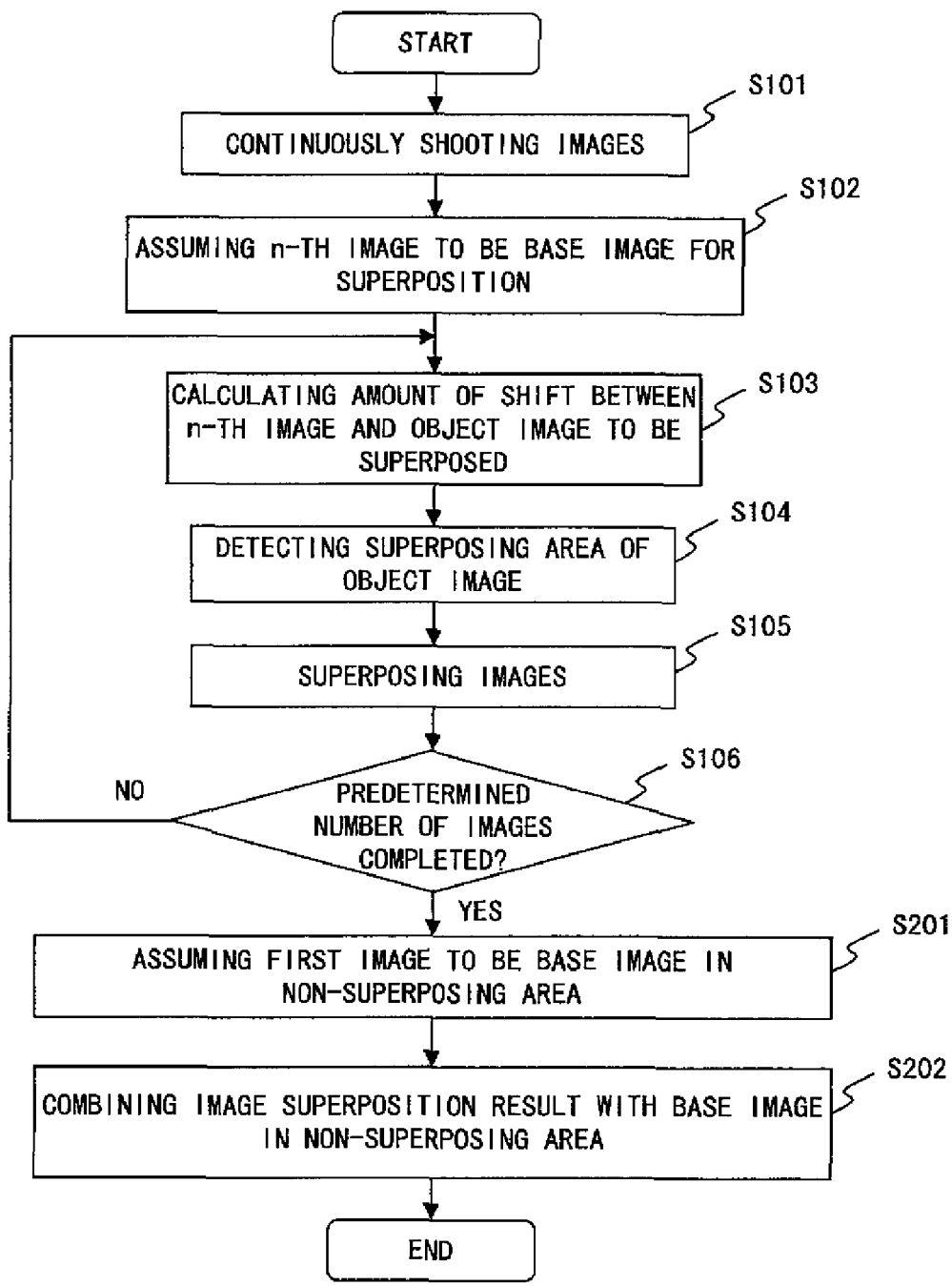
F I G. 5

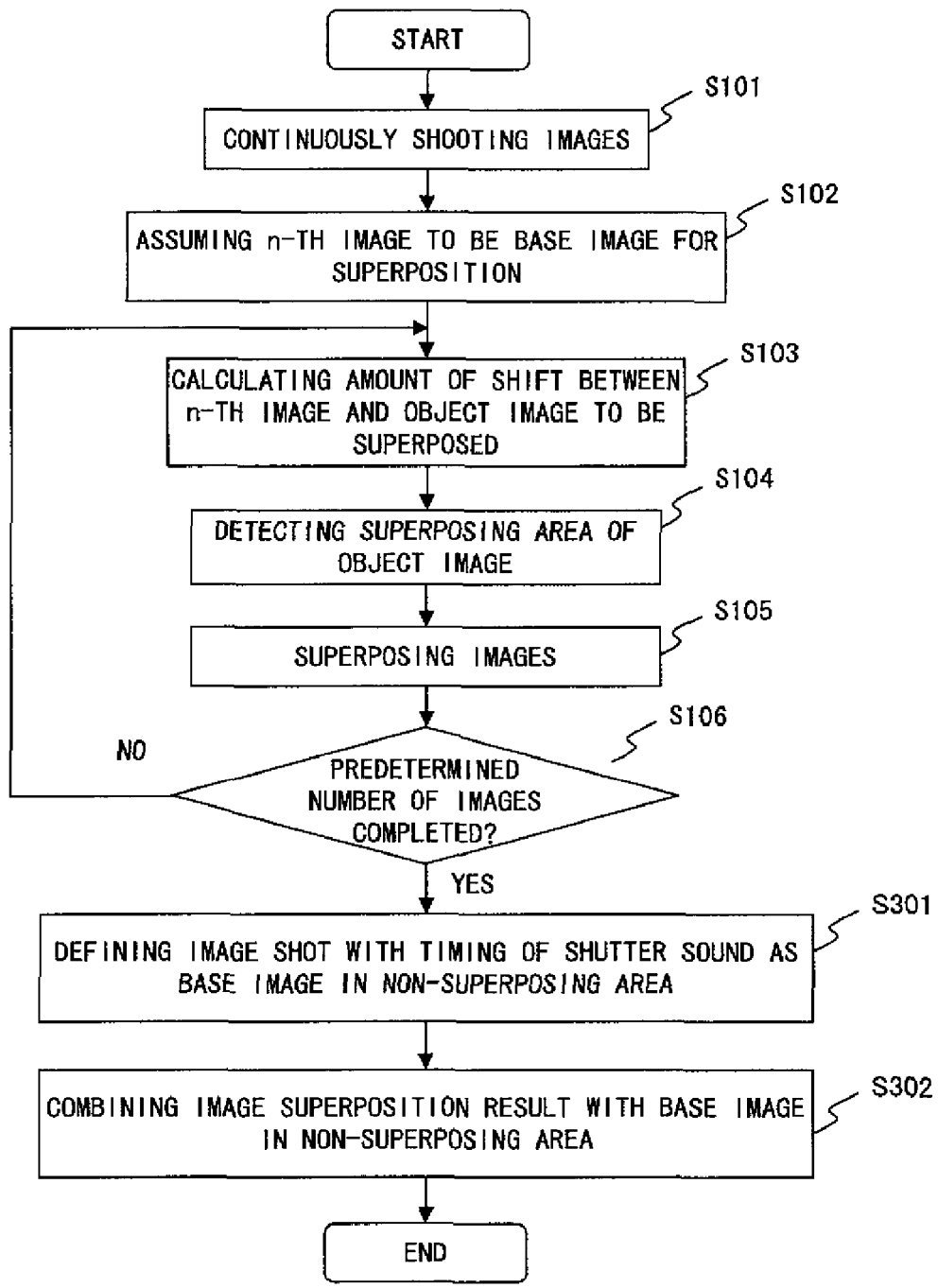
F I G. 6

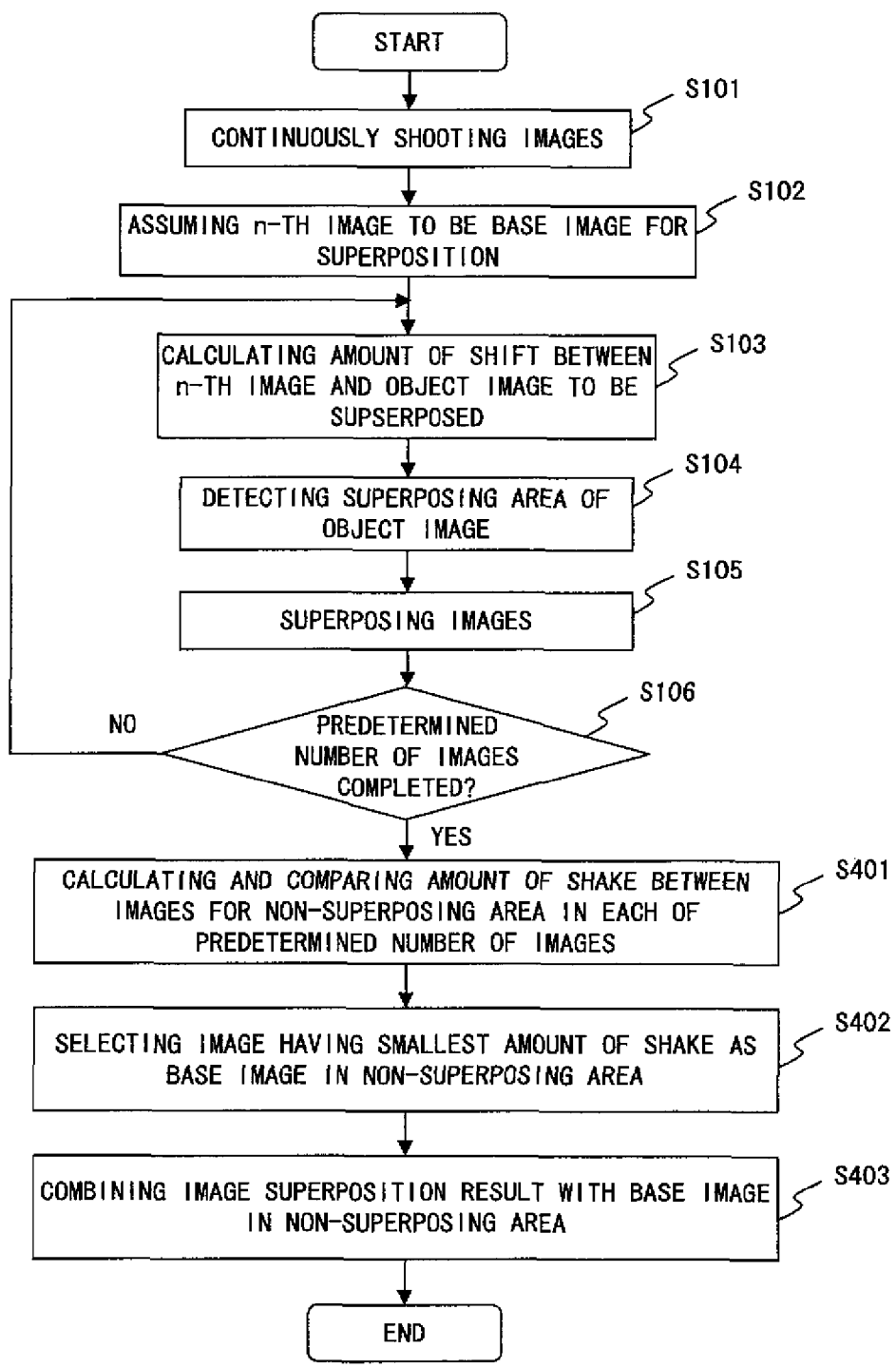
F I G. 8

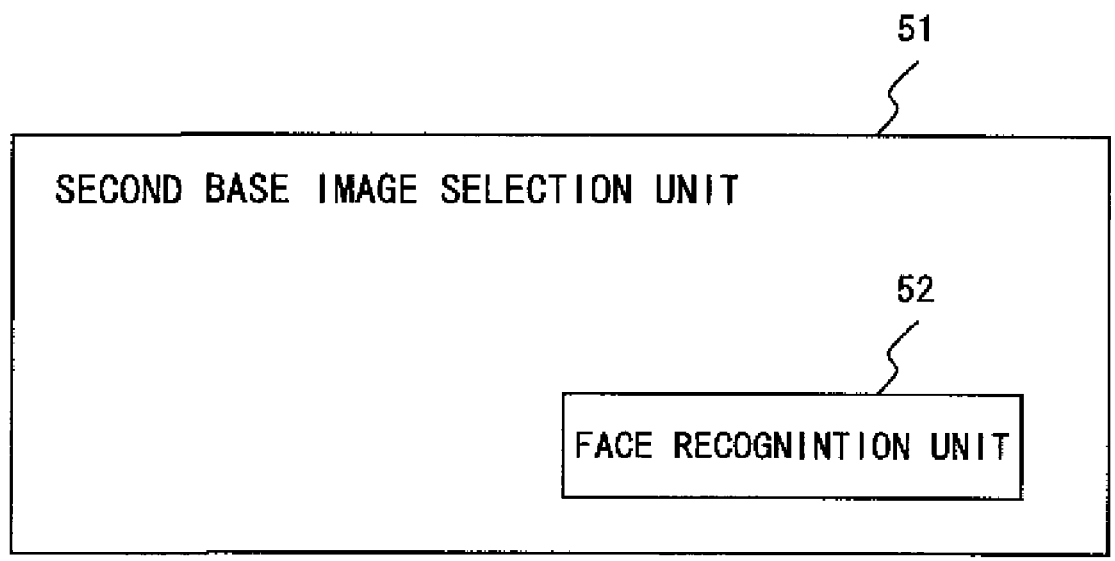
F I G. 9

IMAGE PROCESSING APPARATUS, IMAGE PROCESSING METHOD, IMAGE PROCESSING PROGRAM, AND IMAGE PICKUP APPARATUS

BACKGROUND OF THE INVENTION

1. Field of the Invention

The present invention relates to an image processing apparatus and an image pickup apparatus for processing plural pieces of image data obtained by continuous shooting etc.

2. Description of the Related Art

When image shooting is performed using a digital camera (image pickup apparatus) provided in a mobile telephone etc., the effect of camera shake occurs on an image to be taken by, for example, the hand holding the mobile telephone shakes during the exposure. To suppress the effect of the camera shake, a camera shake correction is made to a taken image.

In the camera shake correcting process, a combining process is performed on plural (N) pieces of image data taken by continuous shooting to obtain one combined image.

The following conventional methods are well known as the combining process.

(1) The first taken image is defined as a base image, and the second through N-th images are sequentially combined with the first base image.

(2) The m-th (for example, m=N/2) taken image is defined as a base image, and other images are sequentially combined with the m-th base image.

In the case of the method (1) above, the camera shake normally occurs in a certain direction. Therefore, as the first through N-th images are sequentially superposed, there occurs a larger shift between the first image (namely, the base image) and the last object image to be superposed, thereby degrading the superposing capability.

Furthermore, in the method (2) above, for example, when the m-th (m=N/2) taken image is a base image, it is expected that the amount of shift is about ½ as compared with the case where the first or N-th image is defined as a base image, thereby improving the superposing capability. However, since the m-th image is a base image for superposition, there occurs a time lag between the image taken at the point of pressing a shutter button and the image used as a base image when the images are superposed although the user considers that the image is taken when the user presses the shutter button. As a result, there occurs a larger shift from a user-desired image.

Various techniques are disclosed as camera shake correction technology.

For example, the patent document 1 discloses an electronic camera having two modes, that is, a blurring correction mode (shake correction mode) and a non-blurring correction mode (non-shake-correction mode). The electronic camera performs a blurring correction (shake correction) only during exposure of a CCD (charge coupled device) and does not perform the blurring correction during an output period of pixel data when the electronic camera is in the photographing preparation period (in the non-blurring correction mode).

The patent document 2 discloses a camera capable of controlling the operation speeds of a mirror and a shutter by changing them from those in the normal photographing mode when the shake prevented photographing mode is selected. A photographing mode selecting part of the camera selects the photographing mode of the camera such as the shake prevented photographing mode, the normal photographing mode, etc. A drive speed altering part outputs to a mirror driving part and a shutter driving part an instruction to change a drive speed of the mirror and the shutter at the start of the exposure on the basis of the selection result of the photographing mode selecting part.

[Patent Document 1] Japanese Published Patent Application No. 2003-333414 "Electronic Camera"

[Patent Document 2] Japanese Published Patent Application No. H7-28149 "Camera Shake Preventive Apparatus"

SUMMARY OF THE INVENTION

The present invention aims at providing an image data processing apparatus, an image data processing method, and an image data processing program capable of obtaining a combined image with higher accuracy from plural pieces of taken image data.

Another objective of the present invention is to provide an image pickup apparatus capable of avoiding a shift of a combined image from a user-desired image.

The image data processing apparatus as the first aspect of the present invention is an image data processing apparatus which processes plural pieces of image data, and includes: a first base image selection unit selecting a piece of image data in plural pieces of taken image data as a first base image used in superposition; a shift amount calculation unit calculating an amount of shift between the first base image selected for superposition and another different piece of image data in the plural pieces of taken image data; an image superposition unit detecting a superposing area as an area in which the different piece of image data can be superposed on the selected first base image after a shift correction is made on a basis of the calculated amount of shift, and performing superposition for the superposing area; a second base image selection unit selecting a piece of image data in the plural pieces of taken image data as a second base image used in a non-superposing area; and an image combination unit combining a superposition result with the non-superposing area in the second base image, and outputting image data as a combination result.

With the above-mentioned configuration, the first and second base image selection units separately select the first base image used in the superposing area when the plural pieces of taken image data are superposed and the second base image used in the non-superposing area.

Thus, for example, by selecting image data having the smallest amount of shake in the non-superposing area in the plural pieces of taken image data as the second base image used in the non-superposing area, or selecting image data recognized as showing the largest open eyes in the face of a person in the non-superposing area in the plural pieces of taken image data as the second base image used in the non-superposing area, the image quality in the non-superposing area in the image data as the combination result can be improved, and a combined image with higher accuracy can be obtained.

The image pickup apparatus as the second aspect of the present invention is an image pickup apparatus which processes plural pieces of image data obtained by continuous shooting, and includes: an image sensor performing an optical/electrical conversion on light received from an object to be captured and outputting optical/electrically converted data; an image data generation unit generating image data on a basis of the optical/electrically converted data; a shooting control unit outputting exposure control information in response to a shoot instruction to the image sensor and taking plural pieces of image data; a first base image selection unit selecting a piece of image data in the plural pieces of taken image data as a first base image used in superposition; a shift amount calculation unit calculating an amount of shift between the first base image selected for superposition and another different piece of image data in the plural pieces of taken image data; an image superposition unit detecting a superposing area as an area in which the different piece of image data can be superposed on the selected first base image after a shift correction is made on a basis of the calculated amount of shift, and performing superposition for the superposing area; a second base image selection unit selecting a piece of image data in the plural pieces of taken image data as a second base image used in a non-superposing area; and an image combination unit combining a superposition result with the non-superposing area in the second base image, and outputting image data as a combination result.

With the above-mentioned configuration, the first and second base image selection units separately select the first base image used in the superposing area when the plural pieces of taken image data are superposed and the second base image used in the non-superposing area.

Therefore, for example, by selecting image data corresponding to the first shot image in the plural pieces of taken image data as the second base image used in the non-superposing area, a shift from a user-desired image can be avoided in the combined image when a user considers that an image taken at the time of pressing a shutter button has been obtained. Additionally, by selecting image data corresponding to the image shot with the timing of a shutter sound in the plural pieces of taken image data as the second base image used in the non-superposing area, a shift from a user-desired image can be avoided in the combined image when a user considers that an image taken at the shutter sound has been obtained.

With the image data processing apparatus according to the present invention, a combined image with higher accuracy can be obtained from plural pieces of taken image data.

Furthermore, with the image pickup apparatus according to the present invention, a shift from a user-desired image can be avoided in a combined image.

BRIEF DESCRIPTION OF THE DRAWINGS

FIG. 3 shows the configuration of the principle of the correcting unit according to the present invention, and is a block diagram showing the configuration of the correcting unit according to the first and second modes for embodying the present invention;

FIG. 4 is a flowchart of the shooting process and the image processing according to the present invention;

FIG. 5 is a flowchart of the shooting process and the image processing according to the first mode for embodying the present invention;

FIG. 6 is a flowchart of the shooting process and the image processing according to the second mode for embodying the present invention;

FIG. 8 is a flowchart of the shooting process and the image processing according to the third mode for embodying the present invention;

FIG. 9 is a block diagram of the configuration of the second base image selection unit (base image selection unit for a non-superposing area) according to the fourth mode for embodying the present invention;

DESCRIPTION OF THE PREFERRED EMBODIMENTS

Described below is a camera shake correction as a field of generating an image by combining a plurality of images. However, the present invention can be applied to a field of performing a similar process other than a camera shake correction.

In combining images performed during the camera shake correction, one image is generated by continuously shooting a specific subject, aligning (shake correcting) each of the continuous shot images, and combining the images.

An image obtained as a combination result has an area (superposing area) configured by a pixel obtained by averaging the pixel values of the pixels at the same positions of a plurality of images taken by continuous shooting, and an area (non-superposing area) configured by a pixel obtained, for example, by multiplying by an integer the pixel value of a pixel in one of a plurality of images taken by continuous shooting. That is, the image as a combination result includes both a superposing area (for example, when the number of continuously shot images is three, an area generated by combining the three images) and a non-superposing area (area generated by the information only about one image).

Figure 1:
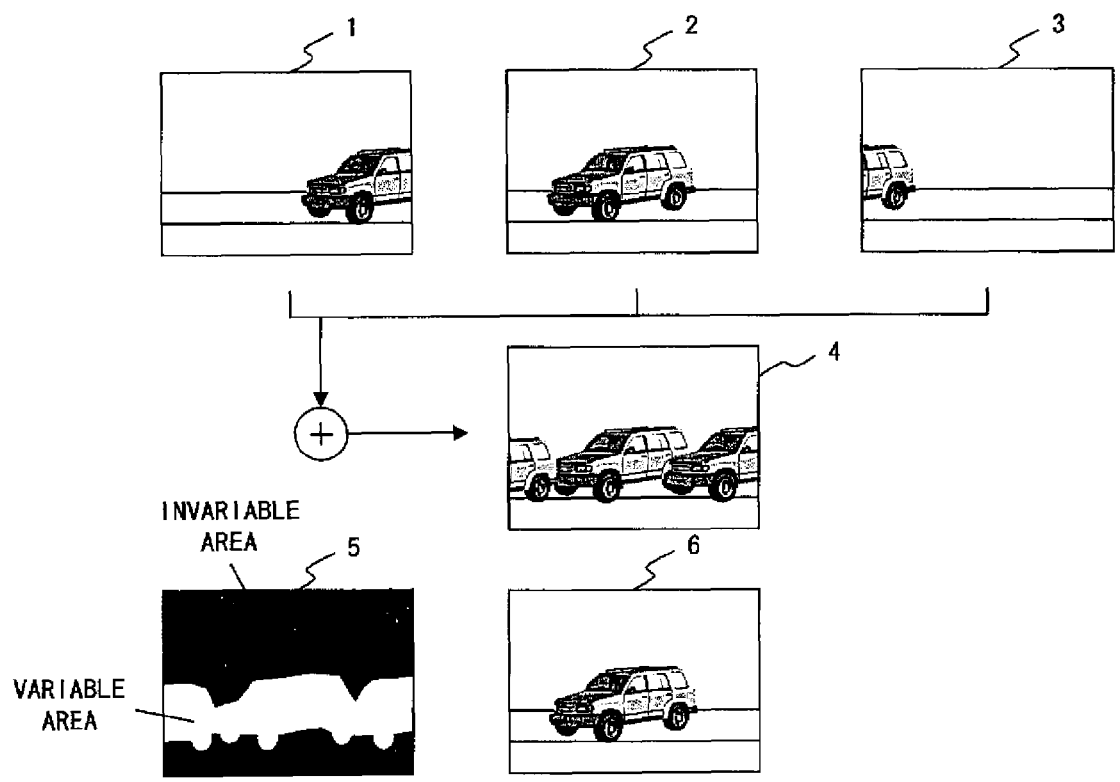
FIG. 1 is an explanatory view of a method of detecting a superposing area according to the present invention.

FIG. 1 is an explanatory view of a method of detecting a superposing area according to the present invention.

In FIG. 1, when three images of images 1 through 3 are simply combined, a resultant image such as an image 4 is generated as a multiplexed image.

Then, after performing a shift correction to align images, the difference between the pixel values at the same positions of the respective images is calculated, and the portion indicating the difference equal to or exceeding a threshold is defined as a variable area (non-superposing area). For example, in the image 5, the variable area is indicated by "white", and the invariable area (superposing area) is indicated by "black".

The feature of the present invention is to independently select a base image in the variable area and invariable area. For example, when the image 2 is used in the variable area and an image obtained by combining the images 1 through 3 is used in the invariable area, an image such as an image 6 is obtained as a result of combining the images 1 through 3.

Described next is the configurations of the image pickup apparatus and the correcting unit within the image pickup apparatus used in each mode for embodying the present invention.

Figure 2:
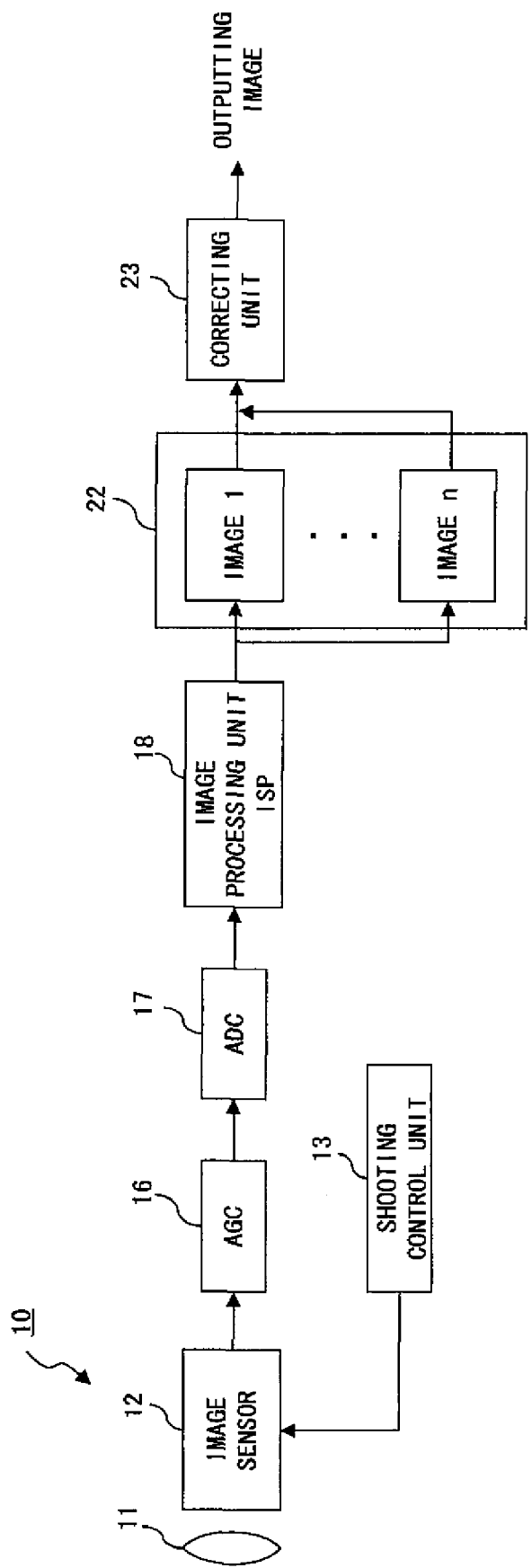
FIG. 2 is a block diagram showing the configuration of the image pickup apparatus common to each mode for embodying the present invention.

FIG. 2 is a block diagram of the configuration of the image pickup apparatus common to each mode for embodying the present invention.

In FIG. 2, an image pickup apparatus 10 includes a lens 11, an image sensor 12, a shooting control unit 13, an AGC (auto gain control) circuit 16, an AD converter (analog-to-digital converter, ADC) 17, an image processing unit (also referred to as an image signal processor (ISP)) 18, an image holding unit 22, and a correcting unit 23.

The lens 11 condenses light from an object to be captured (subject) on the image sensor 12.

The image sensor 12 is provided with a photoreceiving unit (not shown in the attached drawings) performing an optical/ electrical conversion from the light received from an object to be captured through the lens 11 to an electric charge and accumulating the charge, and a signal output unit (not shown in the attached drawings) outputting the accumulated electric charge as optical/electrically converted data.

The AGC circuit 16 controls the gain of the optical/electrically converted data output from the image sensor 12.

The AD converter 17 converts the gain-controlled optical/electrically converted data from analog data to digital data.

The image processing unit 18 generates image data on the basis of the output of the AD converter 17. That is, the image processing unit 18 performs a color separating process, a γ correcting process for linearly representing the brightness on the display, a white balance control process for representing white as white independent of the temperature of a light source, etc. on the basis of a signal (also referred to as "raw data") input from the AD converter 17. In the color separating process, the input signal is converted into a requested format such as a YUV signal, an RGB signal, etc.

In response to a shoot instruction, the shooting control unit 13 outputs a control signal including the exposure control information calculated for the object to be captured to the image sensor 12, thereby plural pieces of image data being taken in the shooting process (process by the photoreceiving unit and the signal output unit) by the image sensor 12.

The plural pieces of image data taken in the shooting process by the image sensor 12 are stored in the image holding unit 22 through the image processing unit 18.

The correcting unit 23 reads the plural pieces of image data stored in the image holding unit 22, generates a piece of camera-shake-corrected (composed) image data on the basis of the read pieces of image data, and outputs the generated image data to the memory (not shown in the attached drawings) provided at the subsequent stage for storing image data. The operation of the correcting unit 23 depends on each mode for embodying the present invention.

When the shooting control unit 13, the image processing unit 18, and the correcting unit 23 are realized as a program, the central processing unit (CPU) for performing the processes of the shooting control unit 13 and the image processing unit 18 can be the CPU for performing the process of the correcting unit 23, or can be provided separately.

FIG. 3 shows the configuration of the principle of the correcting unit according to the present invention, and is a block diagram showing the configuration of the correcting unit according to the first and second modes for embodying the present invention.

In FIG. 3, a correcting unit 30 includes a first base image selection unit 31, a shift amount calculation unit 32, a superposing area detection unit 33, an image superposition unit 34, a second base image selection unit 36, and an image combination unit 38.

The first base image selection unit 31 selects a piece of image data in the plural pieces of image data stored in the image holding unit 22 at the preceding stage of the correcting unit 30 as the first base image used when superposition is performed.

The shift amount calculation unit 32 calculates the amount of shift between the first base image selected for superposition and other image data in the plural pieces of image data stored in the image holding unit 22.

The superposing area detection unit 33 detects on the basis of the calculated amount of shift a superposing area as an area in which other image data can be shift-corrected in comparison with the selected first base image and can be superposed on the first base image.

The image superposition unit 34 performs the superposition in the detected superposing area.

The second base image selection unit 36 selects a piece of image data in the plural pieces of image data stored in the image holding unit 22 as a second base image used in a non-superposing area.

The image combination unit 38 combines the superposition result with the non-superposing area in the second base image, and outputs the image data as a combination result to the subsequent stage.

FIG. 4 is a flowchart showing the outline of the shooting process and the image processing according to the present invention. The flowchart is realized by each of the units shown in FIGS. 2 and 3.

In FIG. 4, first in step S101, images are continuously shot. The outline of the process is described below.

First, in response to a shoot instruction from a user (for example, to press a shutter button), the shooting control unit 13 shown in FIG. 2 outputs a control signal including exposure control information calculated for a object to be captured to the image sensor 12. Then, in the shooting process (by the photoreceiving unit and the signal output unit) using the image sensor 12, a piece of image data is taken. That is, the image sensor 12 optical/electrically converts the light received from the object to be captured through the lens 11 into an electric charge, accumulates the electric charge, and outputs the accumulated electric charge as optical/electrically converted data to the image processing unit 18.

The image processing unit 18 generates (captured) image data on the basis of the received optical/electrically converted data. That is, the image processing unit 18 performs a color separating process, a γ correcting process for linearly representing the brightness on the display, a white balance control process for representing white as white independent of the temperature of the light source, etc. on the basis of the optical/electrically converted data (also referred to as an input signal or raw data). In the color separating process, the input signal is converted into a requested format such as a YUV signal, an RGB signal, etc. Then, the image data generated by the image processing unit 18 is stored in the image holding unit 22. These processes are performed for each of the continuously shot and taken images.

In the subsequent step S102, the first base image selection unit 31 shown in FIG. 3 selects (i.e. chooses) a piece of image data in the plural pieces of image data stored in the image holding unit 22 as a first base image used when superposition is performed.

In step S103, the shift amount calculation unit 32 calculates the amount of shift between the selected first base image and another piece of image data (object image to be superposed) in the plural pieces of image data held by the image holding unit 22. For example, since the continuously shot images as shown in FIG. 1 are the images taken continuously while a vehicle is moving, the position of the vehicle changes in each image. However, (although not certainly indicated in each image shown in FIG. 1), the background of the vehicle, for example, the mountains, forests, etc. in the distance are somewhat shifted due to the effect of camera shake, but they are shifted to an extent that can be ignored as compared with the change in each image of the position of the vehicle. In step S103, the shift between the images of the background portion is calculated as an amount of shift. If the amount of shift between two images is obtained, the pixels corresponding between the two images are detected.

In step S104, the superposing area detection unit 33 makes a shift correction using the calculated amount of shift, thereby aligning the object image to be superposed with the first base image, and calculating the difference between corresponding pixels. Then, it is determined that the pixel having a calculated difference value lower than a threshold can be superposed, and the superposing area for the first base image and the object image to be superposed is detected, where the superposing area is defined as a group of pixels having the difference value lower than the threshold.

In step S105, the image superposition unit 34 performs superposition on the detected superposing area. As a result, the pixels of the corresponding portion of the object image to be superposed are superposed on the detected superposing area in the first base image.

In step S106, it is determined whether or not the process has been completed on a predetermined number of images. For example, when three images are taken by continuous shooting and the second image is set as a first base image, superposition is performed between the second and first images and between the second and third images. Thus, the predetermined number is two.

If it is determined in step S106 that the process has not been completed on a predetermined number of images, then control is returned to step S103.

On the other hand, if it is determined in step S106 that the process of the predetermined number of images has been completed, then, in step S107, the second base image selection unit 36 selects (i.e. chooses) apiece of image data in the plural pieces of image data held in the image holding unit 22 as the second base image used in a non-superposing area. The processes in step S103 through S105 are performed plural times, the common portion between the first base image and the object images to be superposed is detected as a final superposing area, and for the final superposing area, an area excluding the final superposing area, that is, non-superposing area (variable area) is obtained.

In step S108, the image combination unit 38 combines the superposition result (for example, the first base image after performing the superposing process) with the non-superposing area in the second base image, and the image data of the combination result is output to the subsequent stage.

FIG. 5 is a flowchart of the shooting process and the image processing according to the first mode for embodying the present invention. The flowchart is realized by each of the units shown in FIGS. 2 and 3.

Since steps S101 through S106 are similar to those shown in FIG. 4, the explanation is omitted here.

In step S102 in this process, a predetermined n-th piece of image data is defined and selected as a first base image, but it is also possible to use other methods as a method of selecting the first base image.

(If it is determined in step S106 that the process has been completed for a predetermined number of images), the second base image selection unit 36 selects in step S201 the image data corresponding to the image first shot in the plural pieces of image data held in the image holding unit 22 as a second base image used in a non-superposing area.

In the next step S202, the image combination unit 38 combines a superposition result (for example, the first base image after performing the superposing process) with the non-superposing area in the second base image, and outputs the image data as a combination result to the subsequent stage.

In the first mode for embodying the present invention, the image data corresponding to the first shot image in the plural pieces of taken image data is selected as a second base image used in a non-superposing area, thereby avoiding a shift in the combined image from a user-desired image when the user consider that the image at the press of the shutter button has been taken.

FIG. 6 is a flowchart of the shooting process and the image processing according to the second mode for embodying the present invention. The flowchart is realized by each of the units shown in FIGS. 2 and 3.

Since steps S101 through S106 are similar to those shown in FIG. 4, the explanation is omitted here.

(If it is determined in step S106 that the process has been completed for a predetermined number of images), the second base image selection unit 36 selects in step S301 the image data corresponding to the image shot with the timing of the shutter sound in the plural pieces of image data held in the image holding unit 22 as a second base image used in a non-superposing area.

In the next step S302, the image combination unit 38 combines a superposition result (for example, the first base image after performing the superposing process) with the non-superposing area in the second base image, and outputs the image data as a combination result to the subsequent stage.

In the second mode for embodying the present invention, the image data corresponding to the image shot with the timing of the shutter sound in the plural pieces of taken image data is selected as a second base image used in a non-superposing area, thereby avoiding a shift in the combined image from a user-desired image when the user consider that the image at the shutter sound has been taken.

Described below is the third mode for embodying the present invention.

Figure 7:
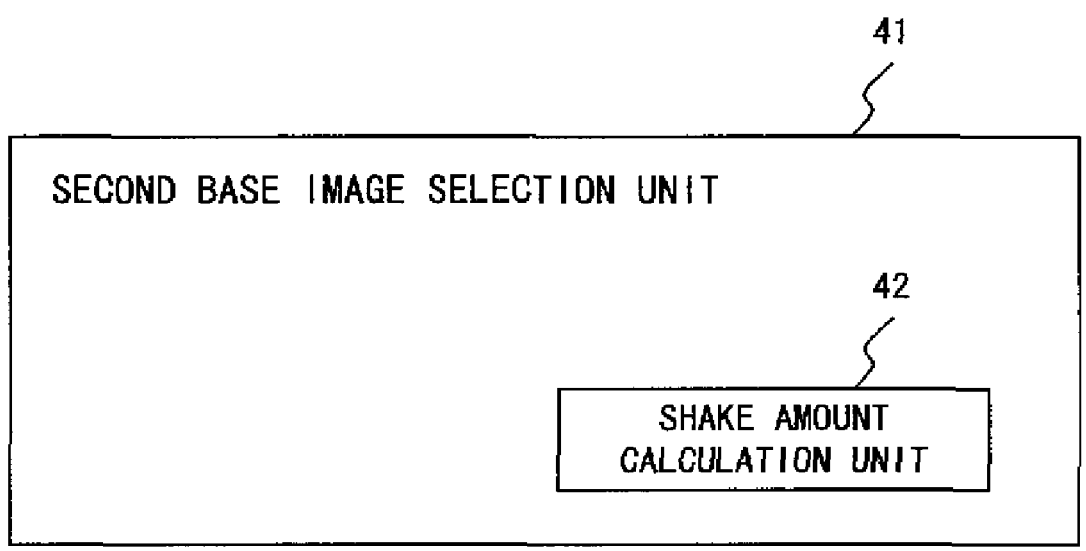
FIG. 7 is a block diagram of the configuration of the second base image selection unit (base image selection unit for a non-superposing area) according to the third mode for embodying the present invention.

FIG. 7 is a block diagram of the configuration of the second base image selection unit (base image selection unit for non-superposing area) according to the third mode for embodying the present invention.

In FIG. 7, a second base image selection unit 41 includes a shake amount calculation unit 42.

The shake amount calculation unit 42 detects an edge (outline) in the non-superposing area for each of the plural pieces of image data held by the image holding unit 22. The edge is the density change boundary in one piece of image data, and the non-superposing area is noticed from the second base image selection unit 41. Then the shake amount calculation unit 42 performs a process of trailing the direction and amount of the travel of the edge portion in each piece of image data taken in the continuous shooting, and calculates the vector quantity, that is, the amount of shake up and down, right and left, and clockwise and counterclockwise in each piece of image data.

For example, the shake amount calculation unit 42 calculates the respective resolutions of edge portions respectively detected in the plural pieces of image data held by the image holding unit 22, and notifies the second base image selection unit 41 of the information for identification of the image data having the highest resolution in the plural pieces of image data. In this case, higher resolution indicates a smaller amount of shake, and lower resolution indicates a larger amount of shake. That is, the image data of the highest resolution indicates the image data having the smallest amount of shake.

The second base image selection unit 41 selects the image data designated by the information notified by the shake amount calculation unit 42 as a base image used in a non-superposing area.

FIG. 8 is a flowchart of the shooting process and the image processing according to the third mode for embodying the present invention. The flowchart is realized by each of the units shown in FIGS. 2, 3, and 7.

Since steps S101 through S106 are similar to those shown in FIG. 4, the explanation is omitted here.

(If it is determined in step S106 that the process has been completed on a predetermined number of images), in step S401, the shake amount calculation unit 42 shown in FIG. 7 detects an edge (outline) in the non-superposing area for each of the plural pieces of image data held by the image holding unit 22. The edge is the density change boundary in one piece of image data, and the non-superposing area is noticed from the second base image selection unit 41. Then, also in step S401, the shake amount calculation unit 42 performs a process of trailing the direction and amount of the travel of the edge portion in each piece of image data taken in the continuous shooting, and calculates the vector quantity, that is, the amount of shake up and down, right and left, and clockwise and counterclockwise in each piece of image data. For example, the shake amount calculation unit 42 calculates the respective resolutions of edge portions respectively detected in the plural pieces of image data held by the image holding unit 22, and notifies the second base image selection unit 41 of the information for identification of the image data having the highest resolution in the plural pieces of image data.

In the next step S402, the second base image selection unit 41 shown in FIG. 7 selects (i.e. chooses) the image data designated by the information noticed by the shake amount calculation unit 42 as a base image used in a non-superposing area.

In the next step S403, the image combination unit 38 shown in FIG. 3 combines a superposition result (for example, the first base image after performing the superposing process) with the non-superposing area in the second base image, and outputs the image data as a combination result to the subsequent stage.

In the description above, the shake amount calculation unit 42 detects edges in the plural pieces of image data held by the image holding unit 22, but it also can detect feature points.

In this case, the process performed by each unit shown in FIG. 7 is described below.

The shake amount calculation unit 42 detects an edge (outline) in the non-superposing area for each of the plural pieces of image data held by the image holding unit 22. The edge is the density change boundary in one piece of image data, and the non-superposing area is noticed from the second base image selection unit 41. Then, the shake amount calculation unit 42 extracts from the edge portion as a feature point only the portion, whose feature can be easily recognized, such as a high brightness point, an end point, a vertex, a branch point, a cross point, etc., and performs a process of trailing the direction and amount of the travel of the feature point portion in each piece of image data taken in the continuous shooting. As a result of the process of trailing, the shake amount calculation unit 42 calculates the vector quantity, that is, the amount of shake up and down, right and left, and clockwise and counterclockwise in each piece of image data.

For example, the shake amount calculation unit 42 calculates the respective resolutions of feature point portions respectively detected in the plural pieces of image data held by the image holding unit 22, and notifies the second base image selection unit 41 of the information for identification of the image data having the highest resolution in the plural pieces of image data. In this case, the image data of the highest resolution indicates the image data having the smallest amount of shake.

The second base image selection unit 41 selects the image data designated by the information notified by the shake amount calculation unit 42 as a base image used in a non-superposing area.

In the third mode for embodying the present invention, the image data having the smallest amount of shake in the non-superposing area in the plural pieces of taken image data is selected as the second base image used in a non-superposing area, thereby improving the image quality in the non-superposing area in the image data as a combination result and obtaining a combined image with higher accuracy. In the calculation of the amount of shift in the first through third modes for embodying the present invention, an amount of shake can also be taken into account.

Described below is the fourth mode for embodying the present invention.

FIG. 9 is a block diagram of the configuration of the second base image selection unit (base image selection unit for non-superposing area) according to the fourth mode for embodying the present invention.

In FIG. 9, a second base image selection unit 51 includes a face recognition unit 52.

The face recognition unit 52 first detects a face search area in the non-superposing area noticed from the second base image selection unit 51 in the plural pieces of image data held by the image holding unit 22. That is, it extracts a skin color area as color information from the image data, and when the shape and the dimension of the skin color area satisfy the condition as a face area, the extracted skin color area is defined as a face search area.

Next, a face recognition unit 52 extracts a face feature point as a candidate for a face element (right eyebrow, left eyebrow, right eye, left eye, nares, and mouth). For example, the area corresponding to the following items is extracted as a face feature point from the detected face search area.

1. A horizontally extending area
2. An oval-like and red area
3. An area having the brightness value lower than the brightness value of the skin color area For example, a horizontally extending face feature point having a low brightness value and a small change can be recognized as an eyebrow or a closed eye. An oval-like face feature point having a dark central area surrounded by two bright areas can be recognized as an open eye. An oval-like face feature point indicating reddish as color information can be recognized as a mouth.

Furthermore, the face recognition unit 52 notifies the second base image selection unit 51 of the information identifying the image data of the highest open level of eyes in the plural pieces of image data held in the image holding unit 22 and in which two eyes are detected.

The second base image selection unit 51 selects the image data designated by the information noticed by the face recognition unit 52 as a base image used in a non-superposing area.

It is possible that all non-superposing areas in the plural pieces of image data held by the image holding unit 22 include no human faces. In this case, the face recognition unit 52 notifies the second base image selection unit 51 that no image showing open eyes is detected.

The process performed by the second base image selection unit 51 notified that an image showing open eyes has not been detected is not limited, but for example, the processes according to the first through third modes for embodying the present invention can be performed.

Figure 10:
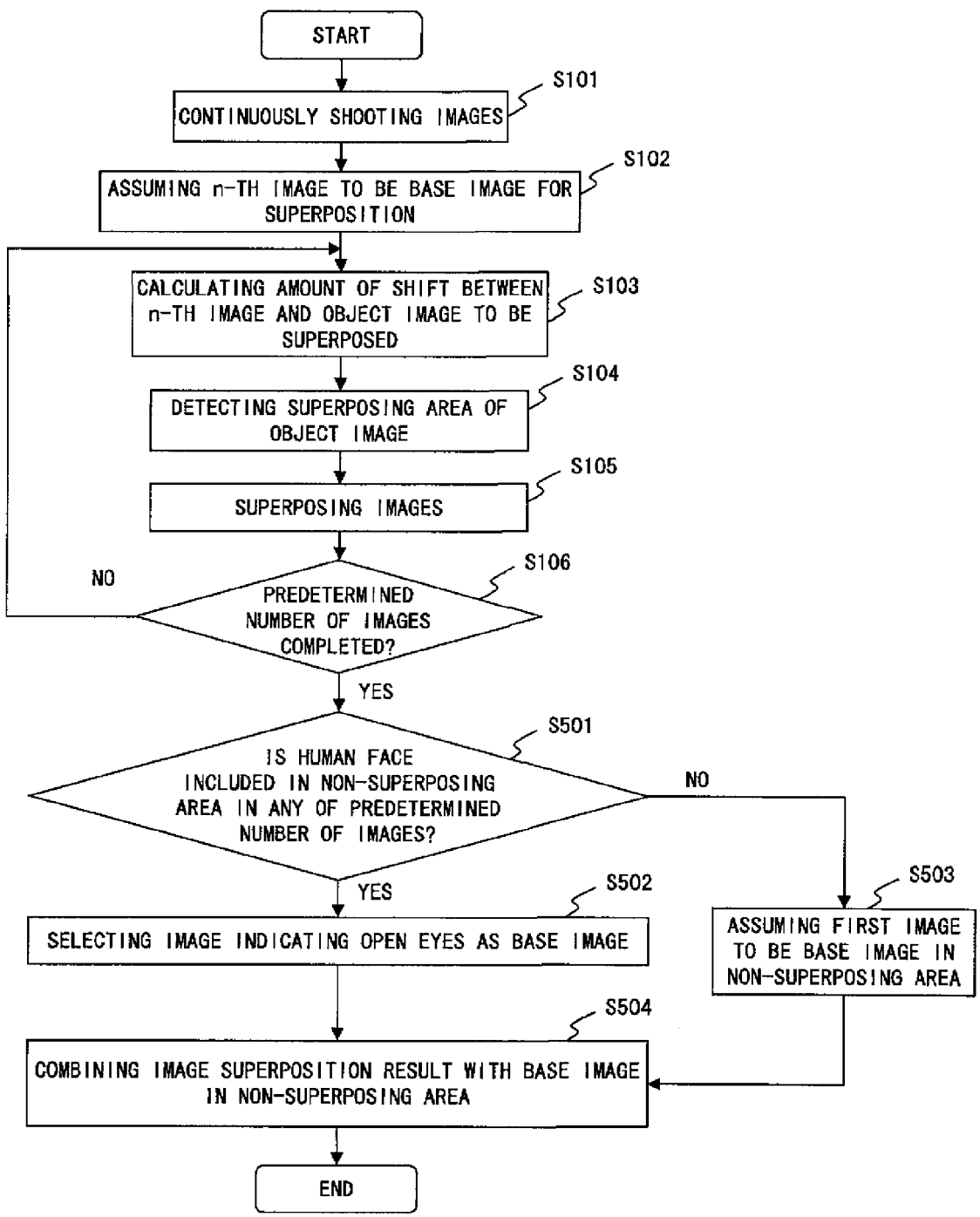
FIG. 10 is a flowchart of the shooting process and the image processing according to the fourth mode for embodying the present invention.

FIG. 10 is a flowchart of the shooting process and the image processing according to the fourth mode for embodying the present invention. The flowchart is realized by each of the units shown in FIGS. 2, 3, and 9.

The steps S101 through S106 are similar to those shown in FIG. 4, the explanation is omitted here.

(If it is determined in step S106 that the process has been completed on a predetermined number of images), in step S501, the face recognition unit 52 shown in FIG. 9 detects a face search area in the non-superposing area noticed from the second base image selection unit 51 in the plural pieces of image data held by the image holding unit 22, and determines whether or not a human face is included in the data.

If the face recognition unit 52 determines in step S501 that a human face is included, in step S502, the face recognition unit 52 notifies the second base image selection unit 51 of the information identifying the image data of the highest open level of eyes in the plural pieces of image data held by the image holding unit 22 and in which open eyes are detected. The second base image selection unit 51 then selects (i.e. chooses) the image data designated by the information noticed by the face recognition unit 52 as a base image used in a non-superposing area. Then, control is passed to step S504.

On the other hand, if the face recognition unit 52 determines in step S501 that no human face is included, then the image data corresponding to the first shot image in the plural pieces of image data held by the image holding unit 22 is selected as the second base image used in a non-superposing area in step S503, and control is passed to step S504.

In the next step S504, the image combination unit 38 shown in FIG. 3 combines a superposition result (for example, the first base image after performing the superposing process) with the non-superposing area in the second base image, and outputs the image data as a combination result to the subsequent stage.

In the description above, the process (in step S503) performed when it is determined that no human face is included is the same process as the first mode for embodying the present invention, but the process performed according to the second and third modes for embodying the present invention and other methods of selecting a base image can be adopted as the process in step S503.

In the fourth mode for embodying the present invention, the image data recognized as having the largest open eyes of a human face in the non-superposing area in the plural pieces of taken image data is selected as a second base image used in the non-superposing area, thereby improving the image quality in the non-superposing area in the image data as a combination result, and obtaining a combined image with higher accuracy.

Figure 11:
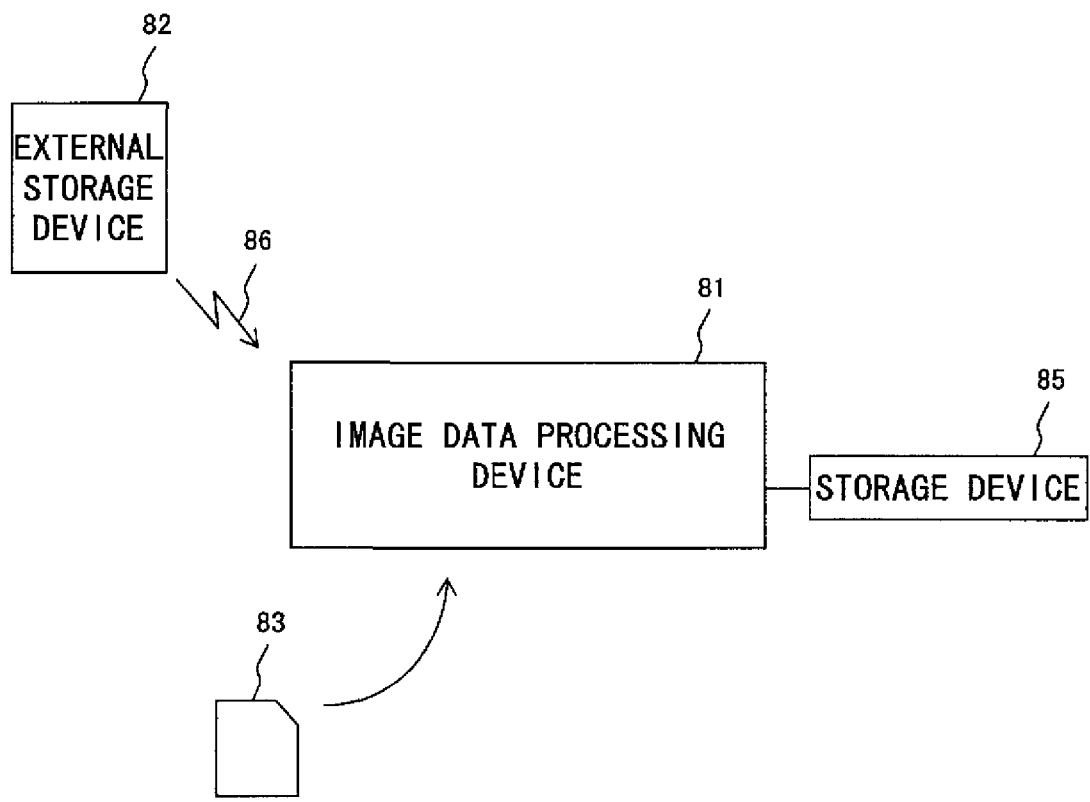
FIG. 11 shows an example of a storage medium.

FIG. 11 shows an example of a storage medium.

The process of combining plural pieces of image data according to the present invention can be realized by an image data processing device 81. The program and data for the processes of the present invention can be loaded into the memory of the image data processing device 81 from a storage device 85 of the image data processing device 81 in order to execute the program, can be loaded into the memory of the image data processing device 81 from a portable storage medium 83 in order to execute the program, or can be loaded into the memory of the image data processing device 81 from an external storage device 82 through a network 86 in order to execute the program.

What is claimed is:

1. An image data processing apparatus which processes plural pieces of image data, comprising:
    a first base image selection unit which selects a piece of image data in plural pieces of taken image data as a first base image used in superposition;
    a shift amount calculation unit which calculates an amount of shift between an image region of a background portion included in the first base image selected for superposition and an image region of the same background portion included in another different piece of image data in the plural pieces of taken image data;
    an image superposition unit which detects a superposing area as an area in which the different piece of image data can be superposed on the selected first base image after a shift correction is made on a basis of the calculated amount of shift, and which performs superposition for the superposing area;
    a second base image selection unit which selects a piece of image data in the plural pieces of taken image data as a second base image used in a non-superposing area; and
    an image combination unit which combines a superposition result with the non-superposing area in the second base image, and which outputs image data as a combination result.

2. The apparatus according to claim 1, wherein the second base image selection unit selects image data having a smallest amount of shake in the image data in the plural pieces of image data as the second base image used in the non-superposing area.

3. The apparatus according to claim 2, wherein the image data having the smallest amount of shake refers to image data having a highest resolution in an edge portion detected in the image data.

4. The apparatus according to claim 2, wherein the image data having the smallest amount of shake refers to image data having a highest resolution of a feature point portion extracted in the image data.

5. The apparatus according to claim 1, further comprising a face recognition unit which recognizes an open level of eyes on a human face in the non-superposing area in the taken image data, wherein
    the second base image selection unit selects, as the second base image used in the non-superposing area, image data recognized by the face recognition unit as indicating largest open eyes on the human face.

6. An image pickup apparatus which processes plural pieces of image data obtained by continuous shooting, comprising:
    an image sensor which performs an optical/electrical conversion on light received from an object to be captured and which outputs optical/electrically converted data;
    an image data generation unit which generates image data on a basis of the optical/electrically converted data;
    a shooting control unit which outputs exposure control information in response to a shoot instruction to the image sensor and which takes plural pieces of image data;
    a first base image selection unit which selects a piece of image data in the plural pieces of taken image data as a first base image used in superposition;
    a shift amount calculation unit which calculates an amount of shift between an image region of a background portion included in the first base image selected for superposition and an image region of the same background portion included in another different piece of image data in the plural pieces of taken image data;
    an image superposition unit which detects a superposing area as an area in which the different piece of image data can be superposed on the selected first base image after a shift correction is made on a basis of the calculated amount of shift, and which performs superposition for the superposing area;
    a second base image selection unit which selects a piece of image data in the plural pieces of taken image data as a second base image used in a non-superposing area; and an image combination unit which combines a superposition result with the non-superposing area in the second base image, and which outputs image data as a combination result.

7. The apparatus according to claim 6, wherein
the second base image selection unit selects image data corresponding to a first shot image in the plural pieces of taken image data as the second base image used in the non-superposing area.

8. The apparatus according to claim 6, wherein
the second base image selection unit selects image data corresponding to an image shot with timing of a shutter sound in the plural pieces of taken image data as the second base image used in the non-superposing area.

9. An image data processing method a processor processes plural pieces of image data, comprising:
selecting a piece of image data in plural pieces of taken image data as a first base image used in superposition;
calculating an amount of shift between an image region of a background portion included in the first base image selected for superposition and an image region of the same background portion included in another different piece of image data in the plural pieces of taken image data;
detecting a superposing area as an area in which the different piece of image data can be superposed on the selected first base image after a shift correction is made on a basis of the calculated amount of shift, and performing superposition for the superposing area;
selecting a piece of image data in the plural pieces of taken image data as a second base image used in a non-superposing area; and
combining a superposition result with the non-superposing area in the second base image, and outputting image data as a combination result.

10. The method according to claim 9, wherein
in the selecting the piece of image data in the plural pieces of taken image data as the second base image, image data having a smallest amount of shake in the image data in the plural pieces of image data is selected as the second base image used in the non-superposing area.

11. The method according to claim 10, wherein
the image data having the smallest amount of shake refers to image data having a highest resolution in an edge portion detected in the image data.

12. The method according to claim 10, wherein
the image data having the smallest amount of shake refers to image data having a highest resolution of a feature point portion extracted in the image data.

13. The method according to claim 9, further comprising
recognizing an open level of eyes on a human face in the non-superposing area in the taken image data, wherein
in the selecting the piece of image data in the plural pieces of taken image data as the second base image , image data recognized in the recognizing as indicating largest open eyes on the human face is selected as the second base image used in the non-superposing area.

14. A computer-readable non-transitory storage medium storing an image data processing program to direct a computer to process plural pieces of image data, the image data processing program comprising:
selecting a piece of image data in plural pieces of taken image data as a first base image used in superposition;
calculating an amount of shift between an image region of a background portion included in the first base image selected for superposition and an image region of the same background portion included in another different piece of image data in the plural pieces of taken image data;
detecting a superposing area as an area in which the different piece of image data can be superposed on the selected first base image after a shift correction is made on a basis of the calculated amount of shift, and performing superposition for the superposing area;
selecting a piece of image data in the plural pieces of taken image data as a second base image used in a non-superposing area; and
combining a superposition result with the non-superposing area in the second base image, and outputting image data as a combination result.

15. The storage medium according to claim 14, wherein
in the selecting the piece of image data in the plural pieces of taken image data as the second base image, the image data processing program directs the computer to select image data having a smallest amount of shake in the image data in the plural pieces of image data as the second base image used in the non-superposing area.

16. The storage medium according to claim 15, wherein
the image data having the smallest amount of shake refers to image data having a highest resolution in an edge portion detected in the image data.

17. The storage medium according to claim 15, wherein
the image data having the smallest amount of shake refers to image data having a highest resolution of a feature point portion extracted in the image data.

18. The storage medium according to claim 14, wherein
the image data processing program further comprises recognizing an open level of eyes on a human face in the non-superposing area in the taken image data, wherein
in the selecting the piece of image data in the plural pieces of taken image data as the second base image, the image data processing program directs the computer to select, as the second base image used in the non-superposing area, image data recognized in the recognizing as indicating largest open eyes on the human face.

\* \* \* \* \*